(12) United States Patent
Terada et al.

(10) Patent No.: US 8,373,700 B2
(45) Date of Patent: Feb. 12, 2013

(54) IMAGE PROCESSING APPARATUS

(75) Inventors: Munehiro Terada, Saitama (JP);
Kenichi Nagai, Gunma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 559 days.

(21) Appl. No.: 12/369,585

(22) Filed: Feb. 11, 2009

(65) Prior Publication Data

US 2010/0026685 A1 Feb. 4, 2010

(30) Foreign Application Priority Data

Aug. 4, 2008 (JP) ................................. 2008-201200

(51) Int. Cl.
*G06T 17/00* (2006.01)

(52) U.S. Cl. ...................................................... 345/428

(58) Field of Classification Search .................. 345/428; 348/441, 563
See application file for complete search history.

(56) References Cited

U.S. PATENT DOCUMENTS

| | | | |
|---|---|---|---|
| 6,263,502 B1 * | 7/2001 | Morrison et al. ................ 725/47 |
| 2002/0009289 A1 | 1/2002 | Morishita et al. |
| 2005/0243103 A1 * | 11/2005 | Rudolph ....................... 345/647 |
| 2007/0041664 A1 * | 2/2007 | Yamada ........................ 382/299 |
| 2007/0139536 A1 | 6/2007 | Watanabe |
| 2007/0230812 A1 * | 10/2007 | Ku .................................. 382/250 |
| 2008/0030450 A1 * | 2/2008 | Yamagishi et al. ............. 345/89 |
| 2008/0170161 A1 | 7/2008 | Ogino et al. |
| 2008/0211959 A1 * | 9/2008 | Balram et al. ................ 348/441 |

FOREIGN PATENT DOCUMENTS

| | | |
|---|---|---|
| JP | 06-268968 | 9/1994 |
| JP | 11-003062 | 1/1999 |
| JP | 2000-188680 | 7/2000 |
| JP | 2002-044604 | 2/2002 |
| JP | 2006-195856 | 7/2006 |
| JP | 2007-052672 | 3/2007 |
| JP | 2007-140436 | 6/2007 |
| JP | 2007-189665 | 7/2007 |
| JP | 2007-310837 | 11/2007 |
| JP | 2008-035404 | 2/2008 |
| JP | 2008-067110 | 3/2008 |
| JP | 2008-098803 | 4/2008 |
| JP | 2008-146190 | 6/2008 |
| JP | 2008-167102 | 7/2008 |

OTHER PUBLICATIONS

Japanese Patent Application No. 2008-201200, Notice of Rejection, mailed Jun. 9, 2009, (with English Translation).
Japanese Patent Application No. 2010-000216, Notice of Rejection, mailed Nov. 29, 2011, (with English Translation).

* cited by examiner

*Primary Examiner* — Daniel Washburn
*Assistant Examiner* — Kyle Zhai
(74) *Attorney, Agent, or Firm* — Blakely, Sokoloff, Taylor & Zafman LLP

(57) ABSTRACT

According to one embodiment, an image processing apparatus includes a level storage module, a video determination module, and a resolution increasing module. The level storage module stores a super-resolution level in association with a video mode. The super-resolution level indicates intensity of super resolution conversion, in which from a first video signal having first resolution, a second video signal is obtained that has second resolution higher than the first resolution and that is to be displayed in the video mode. The video determination module identifies a video mode and determines a super-resolution level based on the video mode identified. The resolution increasing module performs the super resolution conversion on the first video signal at the super-resolution level determined by the video determination module.

8 Claims, 5 Drawing Sheets

| VIDEO MODE NO. OR PROGRAM CATEGORY CODE | VIDEO MODE | SUPER-RESOLUTION PARAMETER |
|---|---|---|
| 1 | VIVID | 80 |
| 2 | STANDARD | 50 |
| 3 | CINEMA | 20 |
| 4 | MEMORY | 45 |

| VIDEO MODE NO. OR PROGRAM CATEGORY CODE | VIDEO MODE | SUPER-RESOLUTION PARAMETER |
|---|---|---|
| 1 | VIVID | 80 |
| 2 | STANDARD | 50 |
| 3 | CINEMA | 20 |
| 4 | MEMORY | 45 |

IMAGE PROCESSING APPARATUS

CROSS-REFERENCE TO RELATED APPLICATIONS

This application is based upon and claims the benefit of priority from Japanese Patent Application No. 2008-201200, filed Aug. 4, 2008, the entire contents of which are incorporated herein by reference.

BACKGROUND

1. Field

One embodiment of the invention relates to a technology for increasing resolution of an image.

2. Description of the Related Art

Recent progress in the integration of a personal computer (PC) and a television provides more opportunities to view various types of videos (e.g., sport programs such as football, cartoon programs, and movie programs) on a high-resolution display with high definition (HD) exceeding standard definition (SD).

Video broadcast for SD televisions, video recorded on DVD, or the like has low resolution. Therefore, when users view video in HD size (especially, in full HD size, i.e., full HD resolution of 1920×1080 pixels), the resolution of the video is increased. To increase the resolution of an image, technologies, such as linear interpolation and cubic covolution interpolation, have been used to interpolate the pixel value of the image. With these technologies, however, a sharp image cannot be obtained.

In view of this, a super resolution technology has been studied, in which an image is expanded, and high-frequency component pixels are interpolated between pixels of the expanded image to obtain a sharp high-resolution image (see, for example, Japanese Patent Application Publication (KO-KAI) Nos. 2008-067110 and 2008-146190). The conventional super resolution technology enhances the sharpness of video, and thus users can enjoy the sharp and clear video.

When an image is sharpened by the super resolution technology, it is sometimes the case that block noise occurs in the image or there are distortions or imperfections in perspective between foreground and background objects in the image.

Besides, image sharpening has been known in which the edge of an image is enhanced to sharpen the appearance of the image. The super resolution technology is completely different from the image sharpening in that high-frequency component pixels are newly created. Therefore, it is difficult to adjust the level of sharpening in the same manner as in the image sharpening.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
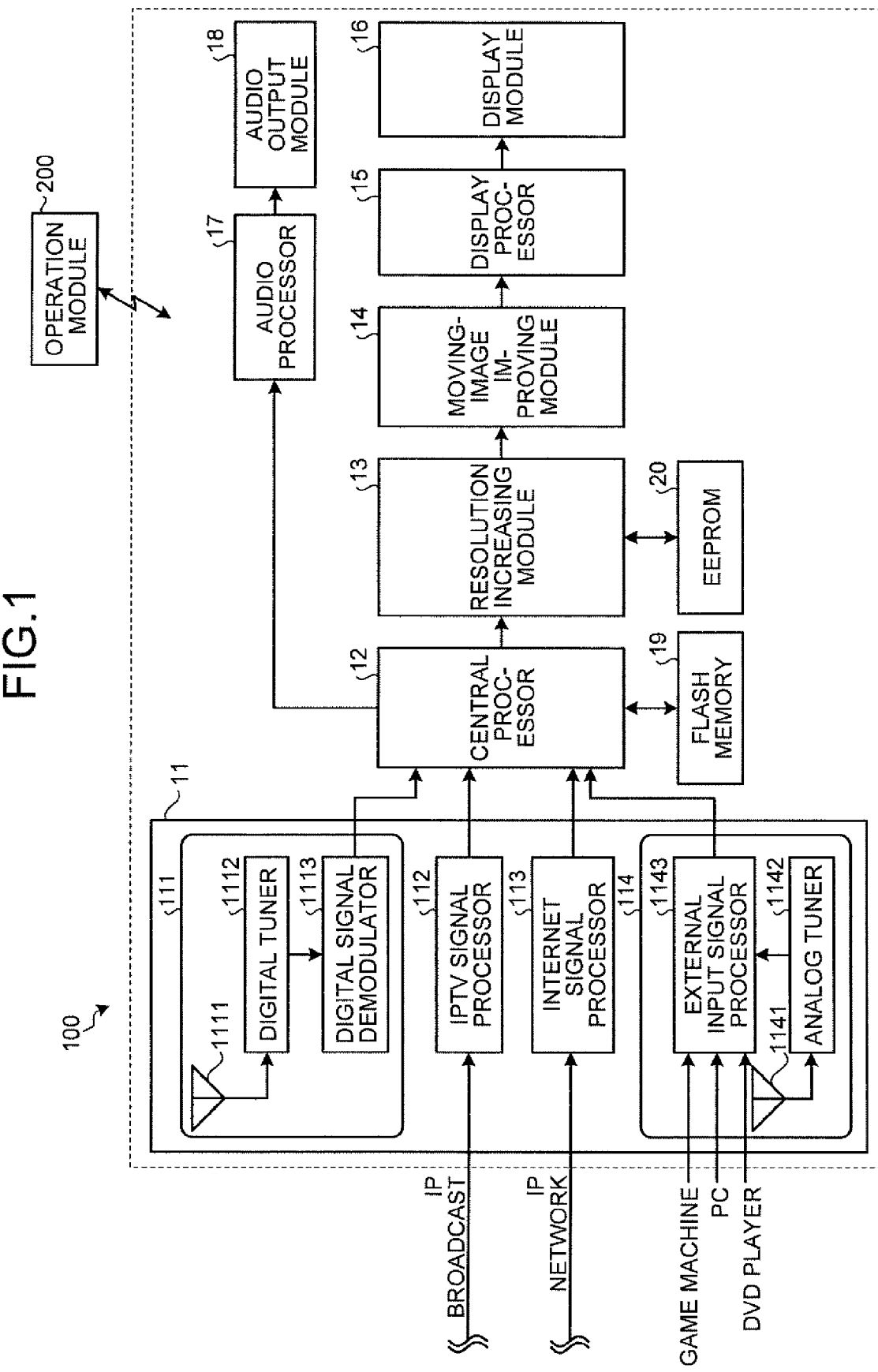
FIG. 1 is an exemplary block diagram of an image display apparatus according to an embodiment of the invention.

Various embodiments according to the invention will be described hereinafter with reference to the accompanying drawings. In general, according to one embodiment of the invention, an image processing apparatus comprises: a level storage module configured to store a super-resolution level indicating intensity of super resolution conversion, in which, on receipt of a first video signal with first resolution, an original pixel value is estimated from the first video signal, and pixels are increased to obtain a second video signal with second resolution that is higher than the first resolution, the super-resolution level being associated with a video mode in which the second video signal is to be displayed; a video determination module configured to identify a video mode and determine a super-resolution level based on the video mode identified; and a resolution increasing module configured to perform the super resolution conversion on the first video signal at the super-resolution level determined by the video determination module.

According to another embodiment of the invention, an image processing apparatus comprises: a level storage module configured to store a super-resolution level indicating intensity of super resolution conversion, in which, on receipt of a first video signal with first resolution, an original pixel value is estimated from the first video signal, and pixels are increased to obtain a second video signal with second resolution that is higher than the first resolution, the super-resolution level being associated with a program category code indicating a category of a program contained in either the first video signal or the second video signal; a video determination module configured to identify a program category code and determine a super-resolution level based on the program category code identified; and a resolution increasing module configured to perform the super resolution conversion on the first video signal at the super-resolution level determined by the video determination module.

According to still another embodiment of the invention, an image processing apparatus comprises: a level storage module configured to store a super-resolution level indicating intensity of super resolution conversion, in which a second video signal with second resolution is obtained from a first video signal with first resolution by increasing the first resolution to the second resolution, the super-resolution level being associated with a video mode in which the second video signal is to be displayed; a video determination module configured to identify a video mode and determine a super-resolution level based on the video mode identified; and a resolution increasing module configured to perform the super resolution conversion on the first video signal at the super-resolution level determined by the video determination module.

According to still another embodiment of the invention, an image processing method comprises: storing a super-resolution level indicating intensity of super resolution conversion, in which, on receipt of a first video signal with first resolution, an original pixel value is estimated from the first video signal, and pixels are increased to obtain a second video signal with second resolution that is higher than the first resolution, the super-resolution level being associated with a video mode in which the second video signal is to be displayed; identifying a video mode to determine a super-resolution level based on the video mode identified; and performing the super resolution conversion on the first video signal at the super-resolution level determined.

FIG. 1 is a schematic block diagram of an image display apparatus 100 according to an embodiment of the invention. As illustrated in FIG. 1, the image display apparatus 100 comprises a video signal input module 11, a central processor 12, a resolution increasing module 13, a moving-image improving module 14, a display processor 15, a display module 16, an audio processor 17, and an audio output module 18. The resolution increasing module 13 corresponds to an image processing apparatus.

The video signal input module 11 comprises a digital broadcast receiver 111, an Internet protocol television (IPTV) signal processor 112, an Internet signal processor 113, and an external input module 114. The digital broadcast receiver 111 receives an video signal to be displayed. The Internet signal processor 113 receives data transmitted through an IP network such as the Internet. The external input module 114 receives input of an analog signal. The term "video signal" as used herein includes audio signals as well as image signals such as still image signals and moving image signals.

The digital broadcast receiver 111 comprises a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives IP broadcasting transmitted over a dedicated IP network, and outputs it to the central processor 12 as a digital video signal.

The Internet signal processor 113 receives data (still image, moving image, etc.) transmitted through an IP network such as the Internet, and outputs it to the central processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing, such as A/D conversion, on an analog signal, and outputs it to the central processor 12 as a digital video signal. The external input signal processor 1143 is provided with a terminal (not shown) for connection to an external device such as a game machine, a personal computer (PC), a digital versatile disk (DVD) player. The external input signal processor 1143 performs the signal processing also on an analog signal received from an external device through the terminal.

Figure 2:
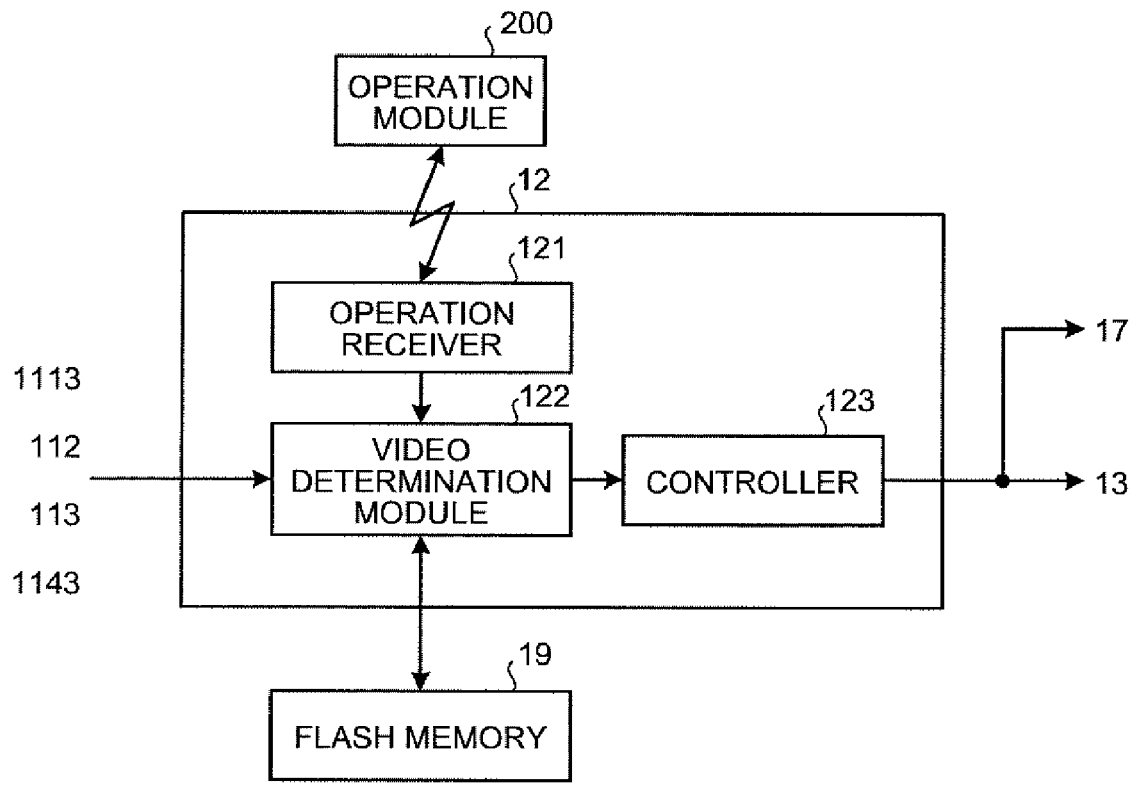
FIG. 2 is an exemplary block diagram of a central processor illustrated in FIG. 1.

FIG. 2 is a functional block diagram of the central processor 12. As illustrated in FIG. 2, the central processor 12 comprises an operation receiver 121, a video determination module 122, a controller 123, and a flash memory 19.

The operation receiver 121 receives, as will be described later, a signal for selecting a video mode (hereinafter, "select signal"), and notifies the video determination module 122, which will be described later, of the video mode corresponding to the select signal. The video mode is specified through an operation module 200. The operation module 200 may comprise a remote controller.

Figures 4, 5:
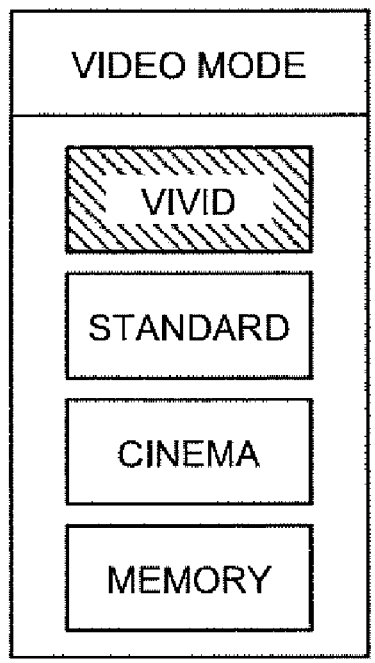
FIG. 4 is an exemplary diagram of a video mode menu displayed on a display module in response to manipulation of an operation module in the embodiment.
FIG. 5 is an exemplary table of super-resolution parameters and video mode numbers stored in an EEPROM in association with each other in the embodiment.

More specifically, for example, when a user presses a mode select button (not shown) for selecting a video mode on the operation module 200, the display module 16 displays a sub-screen (video mode menu) for selecting a video mode in part of its screen. As illustrated in FIG. 4, the video mode menu contains various items as video modes including, for example, "Vivid", "Standard", "Cinema", and "Memory". Then, when the user selects an item from the video mode menu by manipulating a select key such as an up/down key (not shown) on the operation module 200, a select signal is issued to the operation receiver 121. Having received the select signal, the operation receiver 121 outputs it to the video determination module 122. In this manner, the user can specify a desired video mode from the video mode menu. Incidentally, according to the embodiment, for the video modes except for the Memory mode exemplified above, the values of image quality adjustment items are set to their defaults, and the user can freely adjust each of the values as well as the Memory mode. Examples of the image quality adjustment items include "unicolor", "backlight level", "black level", "color density", "hue", and "sharpness". Thus, the video modes offer the user a desired video image depending on a program that the user views, television use state, and the like. Although not shown in the drawings, "Auto" mode may be provided to automatically adjust the values of the respective image quality adjustment items depending on video to view or television use state.

The video modes are each associated with a level of super-resolution processing that is performed on an image signal separated by the controller 123 from a video signal as will be described later. With this, in response to user selection of a video mode, the super-resolution processing is performed correspondingly to the video mode.

Additionally, among the above video modes, the Vivid mode allows the user to enjoy crisp and vivid video images. The intensity of the super-resolution processing is higher in the Vivid mode than in the Standard mode. The Cinema mode allows the user to enjoy a cinema-like viewing experience in the dark room. The intensity of the super-resolution processing is lower in the Cinema mode than in the Standard mode. The Memory mode allows the user to manually specify, through the operation module 200, the level of the super-resolution processing in addition to the image quality adjustment items (e.g., unicolor, backlight level, black level, color density, hue, and sharpness). In other words, the Memory mode corresponds to manual mode and enables fine setting of the level of the super-resolution processing. The level of the super-resolution processing in the Standard mode may be arbitrarily set by the user through the operation module 200, or may be fixed to default.

Upon receipt of a select signal specifying a video mode from the operation module 200, the video determination module 122 outputs a video mode number to the controller 123 as well as writing it to the flash memory 19. The video mode number indicates the type of the video mode specified by the select signal. For example, if the user selects the Vivid mode, the video determination module 122 outputs a video mode number "1" to the controller 123 and write the number to the flash memory 19. In a similar manner, "2" for the Standard mode, "3" for the Cinema mode, and "4" for the Memory mode are output to the controller 123 and written to the flash memory 19.

The controller 123 separates a video signal into an image signal and an audio signal. The controller 123 outputs the image signal subjected to predetermined image processing to the resolution increasing module 13 as well as outputting the audio signal to the audio processor 17.

Examples of the image processing that the controller 123 performs on the image signal include scaling to convert the resolution of the image signal to a predetermined value (e.g., 1280×720).

As described above, the flash memory 19 stores a video mode number corresponding to a select signal received from the operation module 200. A memory or the like (not shown) stores in advance a video mode number corresponding to each of select signals issued from the operation module 200.

Figure 3:
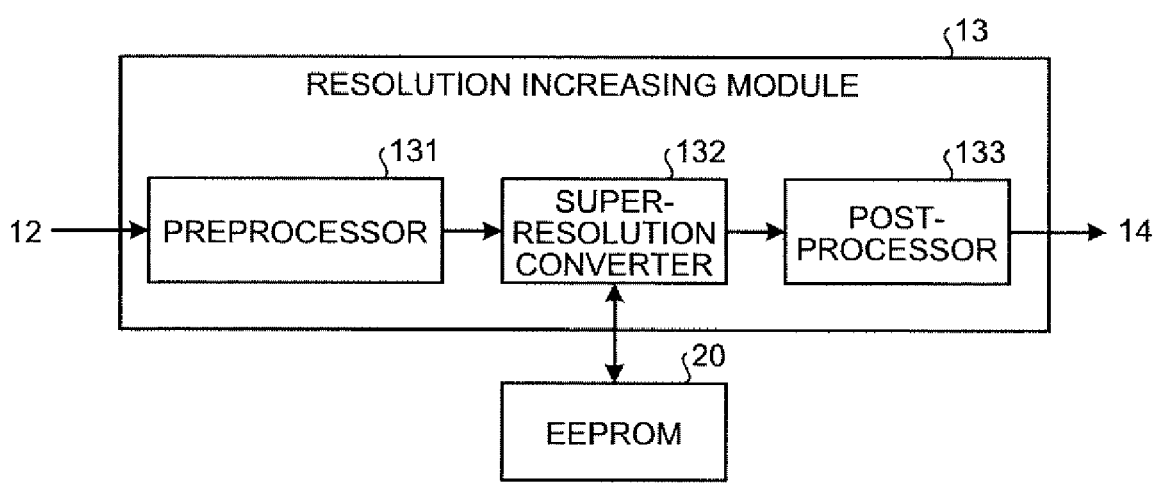
FIG. 3 is an exemplary block diagram of a resolution increasing module illustrated in FIG. 1.

FIG. 3 is a functional block diagram of the resolution increasing module 13. As illustrated in FIG. 3, the resolution increasing module 13 comprises a preprocessor 131, a super-resolution converter 132, a post-processor 133, and an electrically erasable programmable read-only memory (EEPROM) 20.

The preprocessor 131 performs image processing (hereinafter, "preprocessing") on the image signal received from the central processor 12, and then outputs it to the super-resolution converter 132, which will be described later. Examples of the preprocessing include interlace/progressive conversion and noise reduction to remove noise. The preprocessor 131 also receives the video mode number from the central processor 12, and outputs it to the super-resolution converter 132. Incidentally, a signal relative to the video mode number may be directly input from the central processor 12 to the super-resolution converter 132 without via the preprocessor 131.

More specifically, as the interlace/progressive conversion, the preprocessor 131 detects motion of an image from the image signal and determines whether the image is a still image or a moving image. When the image is a still image, the preprocessor 131 performs still image interpolation. On the other hand, when the image is a moving image, the preprocessor 131 performs moving image interpolation.

As the noise reduction, the preprocessor 131 corrects the contour of the image, reduces image blur and glare, suppresses excessive equalizing (high-frequency enhancement), and corrects camera shake blur caused by the horizontal movement of a camera.

The super-resolution converter 132 performs image processing (hereinafter, "super resolution conversion") on a low-resolution frame received from the preprocessor 131 to increase the resolution, thereby generating a frame of high-resolution moving image data in HD size (hereinafter, "high-resolution frame"). The super-resolution converter 132 outputs the high-resolution frame to the post-processor 133.

The term "super resolution conversion" as used herein refers to image sharpening, in which, from an image signal with low resolution, i.e., first resolution, an original pixel value is estimated to increase the pixels and thus to restore an image signal with high resolution, i.e., second resolution. The original pixel value refers to the value of each pixel of an image signal obtained by, for example, photographing the same object as that of an image with low resolution (first resolution) with a camera having high-resolution pixels and capable of capturing an image with high resolution (second resolution).

Besides, "original pixel value is estimated to increase the pixels" means to obtain the characteristics of images to find a correlated image, and estimate an original pixel value from neighboring images (in the same frame or between frames) using the correlated image to increase the pixels. The super resolution conversion may be performed using known or commonly used technologies as disclosed in, for example, Japanese Patent Application Publication (KOKAI) Nos. 2007-310837, 2008-98803, and 2000-188680. In the embodiment, the super resolution conversion uses a technology of, for example, restoring an image with frequency components above the Nyquist frequency determined by the sampling rate of an input image.

If employing the super resolution conversion disclosed in Japanese Patent Application Publication (KOKAI) No. 2007-310837, the super-resolution converter 132 sets a target pixel in each of a plurality of frames of moderate resolution, and sets a target image area so that it contains the target pixel. The super-resolution converter 132 selects a plurality of correspondent points that correspond to a plurality of target image areas closest to a variation pattern of the pixel value in the target image area from the reference frame. The super-resolution converter 132 sets a sample value of luminance of a correspondent point to the pixel value of a corresponding target pixel. The super-resolution converter 132 calculates a pixel value for a high-resolution frame having more pixels than the reference frame and corresponding to the reference frame based on the size of a plurality of sample values and layout of the correspondent points. Thus, the super-resolution converter 132 estimates an original pixel value from a low-resolution image signal, and increases the pixels to restore a high-resolution image signal.

If employing the super resolution conversion using self-congruency position search in the same frame image disclosed in Japanese Patent Application Publication (KOKAI) No. 2008-98803, the super-resolution converter 132 calculates a first pixel position with the smallest error, i.e., a first error, by comparing errors of respective pixels in a search area of a frame of moderate resolution. The super-resolution converter 132 calculates a position with the smallest error in the search area with decimal precision based on the first pixel position and the first error, and a second pixel position around a first pixel and a second error thereof. The super-resolution converter 132 calculates a decimal-precision vector that has its end point at the position with the smallest error and its start point at a pixel of interest. The super-resolution converter 132 calculates an extrapolation vector of the decimal-precision vector that has its end point at a pixel on a screen which is not in the search area based on the decimal-precision vector. The super-resolution converter 132 calculates a pixel value for a high-resolution image having more pixels than an image signal based on a pixel value obtained from the image signal, the decimal-precision vector, and the extrapolation vector. In this manner, the super-resolution converter 132 estimates an original pixel value from a low-resolution image signal, and increases the pixels to restore a high-resolution image signal.

The super-resolution converter 132 may employ the super resolution conversion disclosed in Japanese Patent Application Publication (KOKAI) No. 2000-188680 using mapping between a plurality of frames.

The above technologies of the super resolution conversion are cited by way of example and not by way of limitation. The super-resolution converter 132 may employ various other technologies in which an original pixel value is estimated from a low-resolution image signal to increase the pixels to thereby obtain a high-resolution image signal.

Having received the image signal on which the preprocessor 131 has performed noise reduction, etc., the super-resolution converter 132 performs the super resolution conversion corresponding to the video mode. More specifically, the super-resolution converter 132 retrieves a super-resolution parameter corresponding to the video mode number from, for example, the EEPROM 20.

FIG. 5 illustrates an example of super-resolution parameters stored in the EEPROM 20. As illustrated in FIG. 5, the EEPROM 20 stores super-resolution parameters each in association with a video mode number and a video mode.

The super-resolution parameter represents the intensity of the super resolution conversion by a numeric value. For example, when more pixels having high frequency components are to be interpolated between pixels, the ratio of the high-frequency component pixels to the pixels to be interpolated with them is high, and the super-resolution parameter indicates a lager value. A larger value of the super-resolution parameter indicates a higher sharpening gain and a higher intensity of the super resolution conversion. The super-resolution parameter can be set appropriately according to the manner in which the super resolution conversion is performed. The super-resolution parameters illustrated in FIG. 5 represent, assuming that they are set to 100 when the super resolution conversion is performed on all pixels, the ratio of high-frequency component pixels to be interpolated to all the pixels. In this manner, the index of the super resolution conversion is stored as a parameter. Therefore, if there is a change in the reference of the super resolution conversion, it is possible to easily and efficiently cope with the change.

The super-resolution converter 132 performs the super resolution conversion on an image signal based on the super-resolution parameter, and outputs it to the post-processor 133 described below. More specifically, when receiving the video mode number "1" (the Vivid mode) from the preprocessor 131, the super-resolution converter 132 retrieves a super-resolution parameter "80" associated therewith as illustrated in FIG. 5, and performs the super resolution conversion based on the super-resolution parameter "80".

Referring back to FIG. 3, the post-processor 133 performs image correction (hereinafter, "post-processing") such as gamma correction and white balance adjustment on the image signal received from the super-resolution converter 132, and outputs it to the moving-image improving module 14.

Referring back to FIG. 1, the moving-image improving module 14 will be described. The moving-image improving module 14 performs double-speed processing on the image signal received from the post-processor 133. More specifically, the moving-image improving module 14 converts the frame rate of a video signal transmitted at 60 frames per second (fps) to 120 fps. This reduces image blur in a portion in which an object moves horizontally, vertically, and diagonally or rotates as well as efficiently suppressing noise. Thus, a telop sequence, a sports scene with fast motion, etc. can be displayed clearly. The moving-image improving module 14 outputs the image signal subjected to the frame rate conversion to the display processor 15.

The interpolation may be performed by using an interpolation frame generated according to a commonly used method for interpolation of a frame image such as the interpolation frame generating method based on motion vector detection by block matching disclosed in Japanese Patent Application Publication (KOKAI) No. 2008-35404. In addition, the number of interpolation frames may be arbitrarily determined.

The display processor 15 comprises a driver to output an image signal to the display module 16 so that the display module 16 can display the image signal received from the moving-image improving module 14.

The display module 16 comprises a display panel such as a liquid crystal display (LCD) panel, a plasma panel, or a surface-conduction electron-emitter display (SED) panel. The display module 16 displays an image signal on the screen under the control of the display processor 15.

The operation module 200 may comprise a remote operation device such as a remote controller. When, for example, the user presses the mode select button (not shown) for selecting a video mode, the operation module 200 sends a select signal corresponding thereto to the central processor 12.

Figure 6:
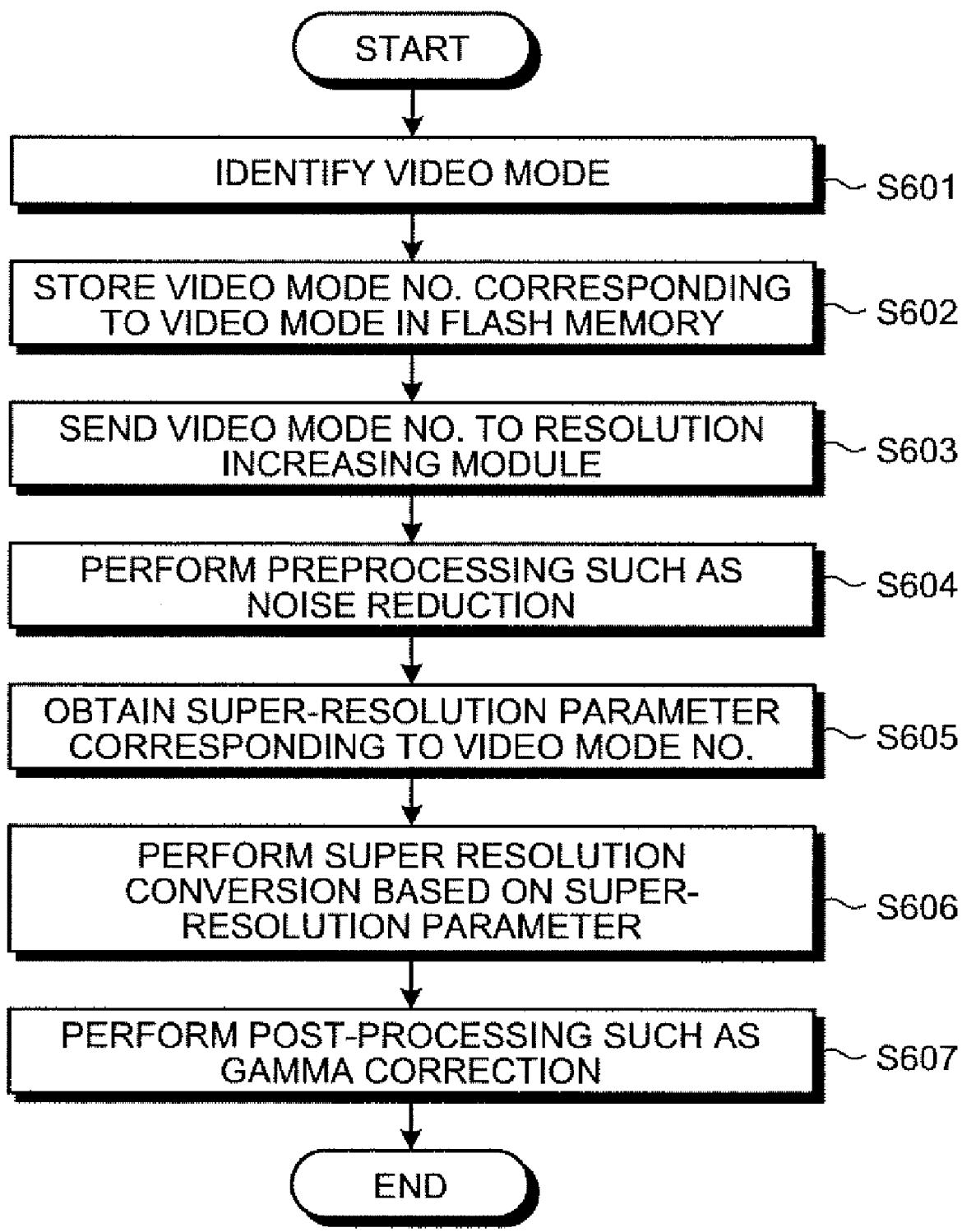
FIG. 6 is an exemplary flowchart of super-resolution processing in the embodiment.

Described below is the operation of the image display apparatus 100 configured as above. FIG. 6 is a flowchart of the super resolution processing performed by the image display apparatus 100 when a user specifies a video mode.

As illustrated in FIG. 6, the video determination module 122 of the central processor 12 identifies a video mode set by a user (S601). The video determination module 122 stores a video mode number corresponding to the video mode in the flash memory 19 (S602). The flash memory 19 or the like may store in advance the video mode number corresponding to the video mode. Thereafter, the video determination module 122 sends the video mode number to the resolution increasing module 13 (S603).

Upon receipt of the video mode number from the video determination module 122, the preprocessor 131 of the resolution increasing module 13 performs preprocessing, such as interlace/progressive conversion and noise reduction, on the image signal, and outputs it with the video mode number to the super-resolution converter 132 (S604). Incidentally, a signal relative to the video mode number may be directly input from the central processor 12 (the video determination module 122) to the super-resolution converter 132 without via the preprocessor 131.

Upon receipt of the video mode number and the image signal from the preprocessor 131, the super-resolution converter 132 obtains a super-resolution parameter corresponding to the video mode number from the EEPROM 20 (S605).

The super-resolution converter 132 performs the super resolution conversion on the image signal at a super-resolution level corresponding to the super-resolution parameter (S606), and outputs it to the post-processor 133. The post-processor 133 performs post-processing such as gamma correction and white balance adjustment on the image signal, and outputs it to the moving-image improving module 14 (S607). The display module 16 displays the image signal under the control of the display processor 15. If the moving-image improving module 14 has functions for the image correction as described above, it may perform the image correction instead of the post-processor 133.

As described above, according to the embodiment, the video determination module 122 of the central processor 12 identifies a video mode specified by a user. The super-resolution converter 132 of the resolution increasing module 13 performs the super resolution conversion according to the video mode. Thus, it is possible to provide video on which the super-resolution processing has been performed appropriately according to the video mode.

In addition, when a video mode is selected in which image quality is adjusted to allow a user to enjoy crisp and vivid video images, the super-resolution parameter is set high so that the super-resolution processing is performed at a high level. On the other hand, when a video mode is selected in which image quality is adjusted to allow a user to enjoy a cinema-like viewing experience in the dark room, the super-resolution parameter is set low so that the super-resolution processing is performed at a low level. With this, the user can easily recognize super-resolution effect in the vivid video images and enjoy them. Besides, in the video mode that allows the user to enjoy delicate images like a movie, the super-resolution processing is performed at a low level. This reduce noise enhancement due to the super-resolution processing and allows the user to enjoy delicate images.

Because of the preferences of individual users for video, the super-resolution parameter may be set in a reverse manner to that described above. That is, the intensity of the super-resolution processing may be set low for the above Vivid mode. By doing so, noise enhancement, etc. can be reduced for video containing a high level of noise components. On the other hand, the super-resolution parameter may be set high for the above Cinema mode. Since a high-resolution video signal causes no/less noise enhancement, the user can enjoy clear video images in the Cinema mode.

In the foregoing, when a user specifies a video mode from among those including Vivid and Cinema modes, the super-resolution processing is performed according to a super-resolution parameter corresponding to the video mode. It may, however, be difficult for the user to determine which video mode is to be selected. In such a case, the super-resolution processing may be performed automatically according to, instead of the video mode, a code in a video signal. The code (hereinafter, "program category code") may indicate the category of a program. For example, program category code "1" indicates a sport program, "2" indicates a variety show, and "3" indicates a movie program. Described below is the super-resolution processing performed in such a manner.

Figure 7:
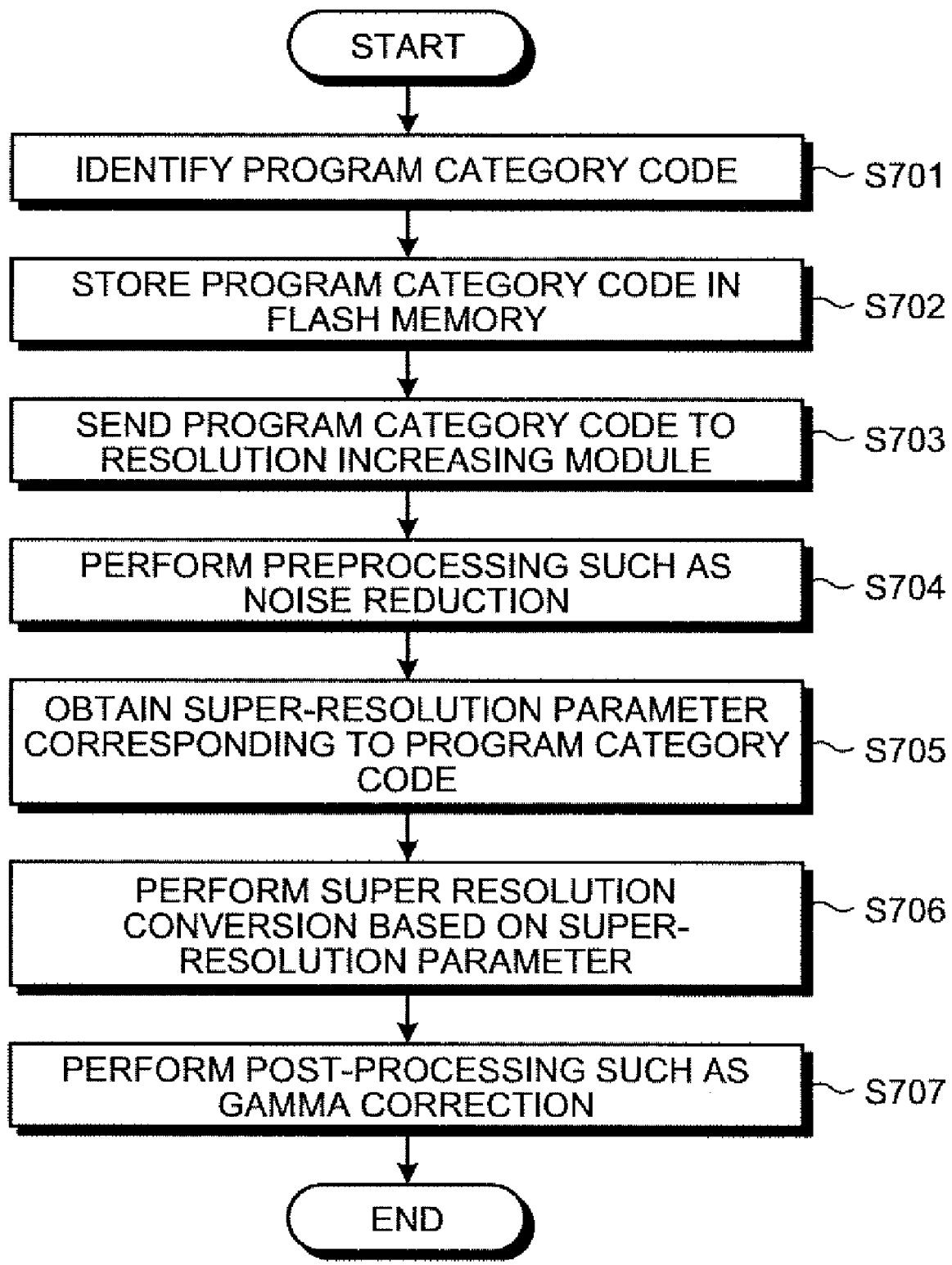
FIG. 7 is another exemplary flowchart of super-resolution processing in the embodiment.

FIG. 7 is a flowchart of the super-resolution processing based on the program category code. The video determination module 122 operates in the same manner as described above and, in addition, identifies a program category code in a video signal received by the video signal input module 11 (S701). The video determination module 122 then stores the program category code in the flash memory 19 (S702). Thereafter, the video determination module 122 sends the program category code to the resolution increasing module 13 (S703).

Upon receipt of the program category code from the video determination module 122, the preprocessor 131 of the resolution increasing module 13 performs preprocessing on the image signal in the same manner as described above (S704).

Upon receipt of the program category code from the preprocessor 131, the super-resolution converter 132 obtains a super-resolution parameter corresponding to the program category code from the EEPROM 20 (S705). The super-resolution converter 132 performs the super resolution conversion on the image signal at a super-resolution level corresponding to the super-resolution parameter (S706). The post-processor 133 performs post-processing on the image signal in the same manner as described above (S707).

As set forth above, the video determination module 122 of the central processor 12 may detect a program category code so that the super-resolution processing can be performed according to the program category code. With this, even if a user finds it difficult to determine which video mode is to be selected, it is possible to provide video on which the super-resolution processing has been performed appropriately according to the program category code.

Further, the video determination module 122 may automatically detect a program category code when a video mode has not been specified so that the super-resolution processing can be performed according to the program category code. Alternatively, the super-resolution parameter may be set based on a combination of a specified video mode and a program category code. In other words, different super-resolution parameters may be set for different combinations of a video mode and a program category code such as, for example, the Vivid mode and a sport program, and the Vivid mode and a movie program.

The information processing apparatus of the embodiment is described by way of example as being applied to the image display apparatus 100 such as a digital TV comprising the display processor 15, the display module 16, the audio processor 17 and the audio output module 18; however, it can be applied to, for example, a tuner or a set-top box without having those modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a level storage module configured to store, upon receipt of a first video signal with first resolution, an image-quality processing level indicating a ratio of high-frequency component pixels to be interpolated to pixels in a resolution-increasing processing in which a pixel is inserted between pixels of the first video signal to generate a second video signal with second resolution higher than the first resolution of the first video signal in association with a video mode,
   a video mode specifying module configured to specify the video mode when operated by a user, and
   a video determination module configured to determine an image-quality processing level based on the specified video mode; and
   a processor configured to perform an image-quality processing on the first video signal at the image-quality processing level determined by the video determination module, wherein
   when the video mode is intended to provide a brighter view than provided in a predetermined video mode, the level storage module associates the video mode with the image-quality processing level such that the ratio of the high-frequency component pixels is higher than in the predetermined video mode.

2. The image processing apparatus of claim 1, further comprising a display device configured to display the second video signal.

3. The apparatus of claim 1, wherein the resolution-increasing processing includes a super-resolution processing.

4. An image processing apparatus comprising:
   a level storage module configured to store, upon receipt of a first video signal with first resolution, an image-quality processing level indicating a ratio of high-frequency component pixels to be interpolated to pixels in a resolution-increasing processing in which a pixel is inserted between pixels of the first video signal to generate a second video signal with second resolution higher than the first resolution of the first video signal in association with a video mode;
   a video mode specifying module configured to specify the video mode when operated by a user;
   a video determination module configured to determine an image-quality processing level based on the specified video mode; and a processor configured to perform an image-quality processing on the first video signal at the image-quality processing level determined by the video determination module, wherein when the video mode is intended to provide a darker view than provided in a predetermined video mode, the level storage module associates the video mode with the image-quality processing level such that the ratio of the high-frequency component pixels is lower than in the predetermined video mode.

5. The image processing apparatus of claim 4, further comprising a display device configured to display the second video signal.

6. The apparatus of claim 4, wherein the resolution-increasing processing includes a super-resolution processing.

7. An image processing apparatus comprising:
a level storage module configured to store, upon receipt of a first video signal with first resolution, an image-quality processing level indicating a ratio of high-frequency component pixels to be interpolated to pixels in a resolution-increasing processing in which a pixel is inserted between pixels of the first video signal to generate a second video signal with second resolution higher than the first resolution of the first video signal in association with a video mode;
a video mode specifying module configured to specify the video mode when operated by a user;
a video determination module configured to determine an image-quality processing level based on the specified video mode; and
a processor configured to perform an image-quality processing on the first video signal at the image-quality processing level determined by the video determination module, wherein
the video mode being one of a plurality of video modes including a first video mode associated with a first image-quality processing level and a second video mode associated with a second image-quality processing level having a ratio of the high-frequency component pixels that is lower than a ratio of the high-frequency component pixels for the first image-quality processing level.

8. The apparatus of claim 7, wherein the resolution-increasing processing includes a super-resolution processing.

* * * * *